June 5, 1956  A. J. ALLEN  2,748,800
GAS METER BY-PASS OPERATOR
Filed Jan. 27, 1954  3 Sheets-Sheet 1

Inventor
Albert J. Allen
by Roberts, Cushman & Grover
Att'ys.

June 5, 1956 A. J. ALLEN 2,748,800
GAS METER BY-PASS OPERATOR
Filed Jan. 27, 1954 3 Sheets-Sheet 3

Inventor
Albert J. Allen
by Robert Cushman & Grace
Att'ys.

United States Patent Office 2,748,800
Patented June 5, 1956

2,748,800
GAS METER BY-PASS OPERATOR

Albert J. Allen, Garden City, N. Y., assignor to Anchor Manufacturing Company, Boston, Mass., a corporation of Massachusetts Application January 27, 1954, Serial No. 406,563

6 Claims. (Cl. 137—637.1)

This invention relates to a gas meter connection of the type having an inlet for supplying gas to a meter, an outlet for delivering gas from the meter, a by-pass having one end connected to the inlet and the other end connected to the outlet, and at said ends inlet and outlet valves having normal positions in which gas can flow through the meter but not through the by-pass and by-pass positions in which gas can flow through the by-pass but not through the meter, thereby to by-pass the flow of gas past the meter while the meter is being repaired or replaced so that the supply of gas to the customer is not interrupted.

Objects of the invention are to provide a by-pass operator which is simple and inexpensive in construction, which can be applied and removed easily, which prevents interruption of gas service, which permits a new meter to be purged of air, which automatically locks the valves in normal position when the operator is removed, and which is durable and reliable in use.

According to the present invention the operator comprises a key for each valve, together with means interconnecting the keys for actuating them conjointly, means for latching the keys in by-pass position, and means permitting the inlet key to move from by-pass position while the outlet key is still latched in by-pass position. Preferably the last means comprises a lost-motion connection in the actuator. In the preferred embodiment the actuator interconnecting the two keys is so constructed that, when the two keys are latched in by-pass position, neither key can move from that position when the outlet key is unlatched. To return both keys to normal position, both keys must be unlatched.

Figure 1:
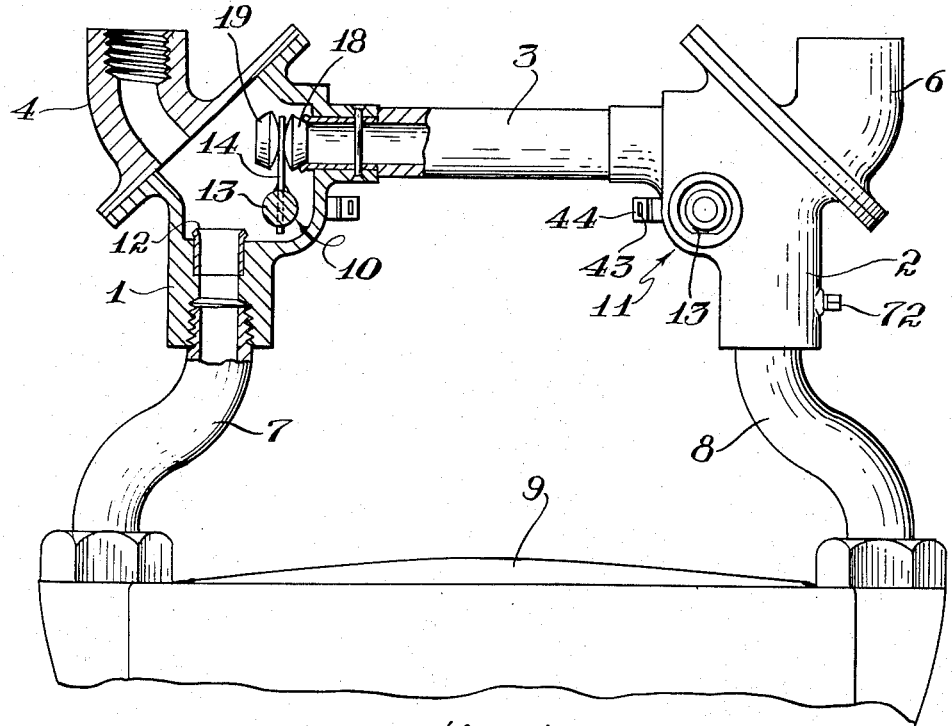
Figure 2:
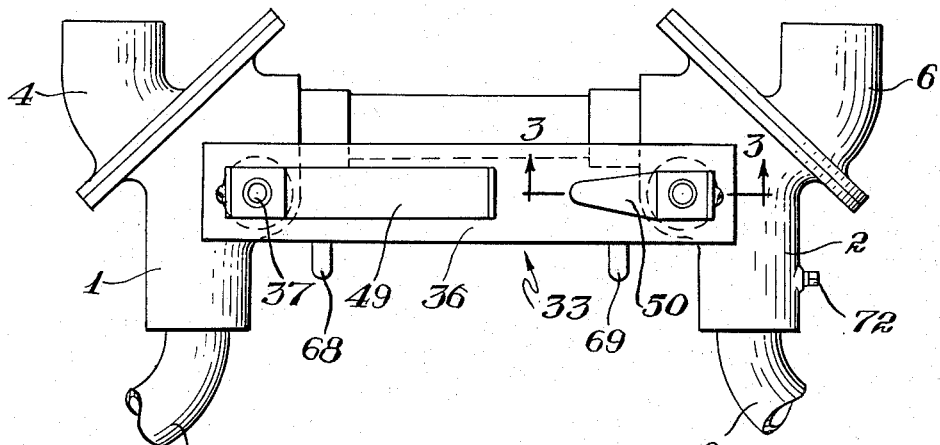
Figure 6:
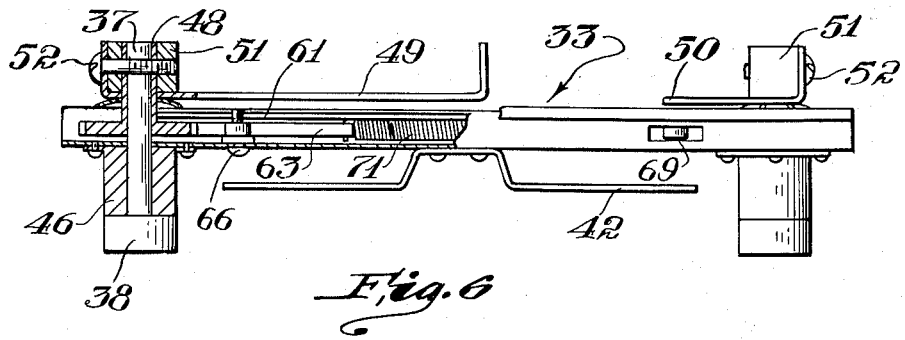
Figure 7:
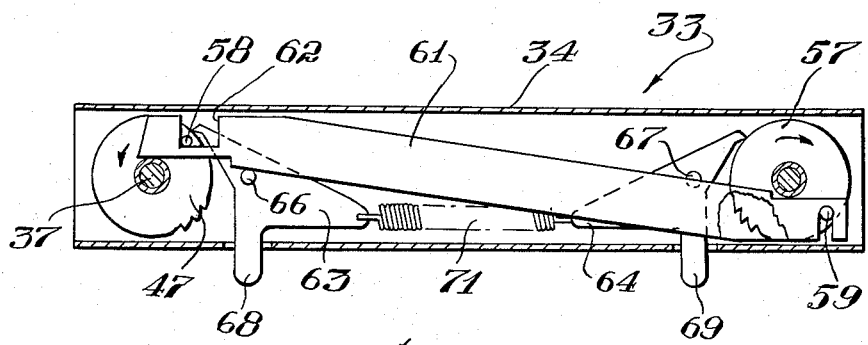
Figure 8:
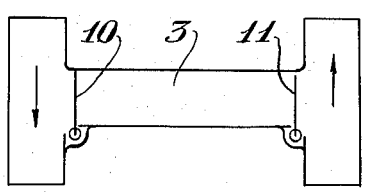
Figure 9:
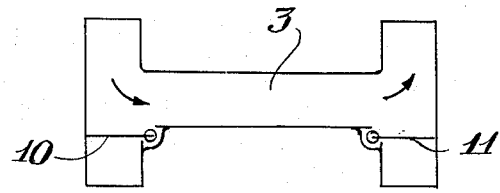
Figure 10:
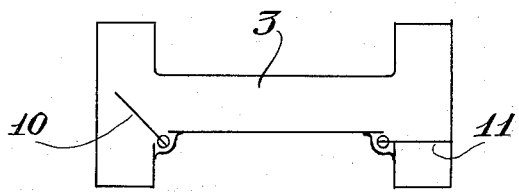
Figure 3:
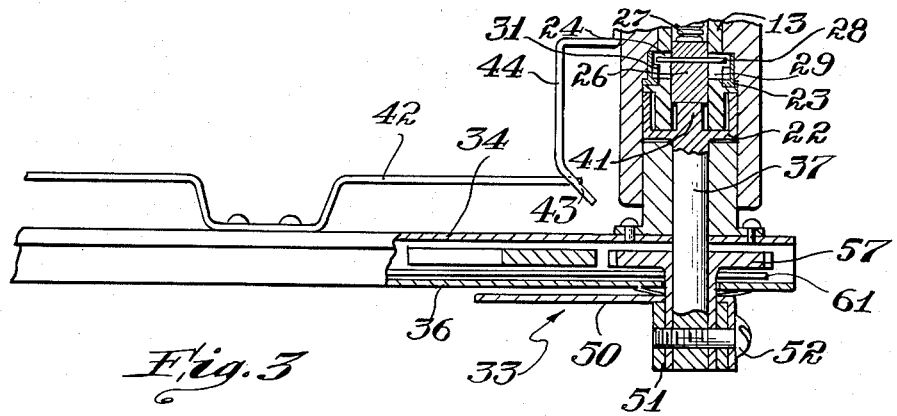
Figure 4:
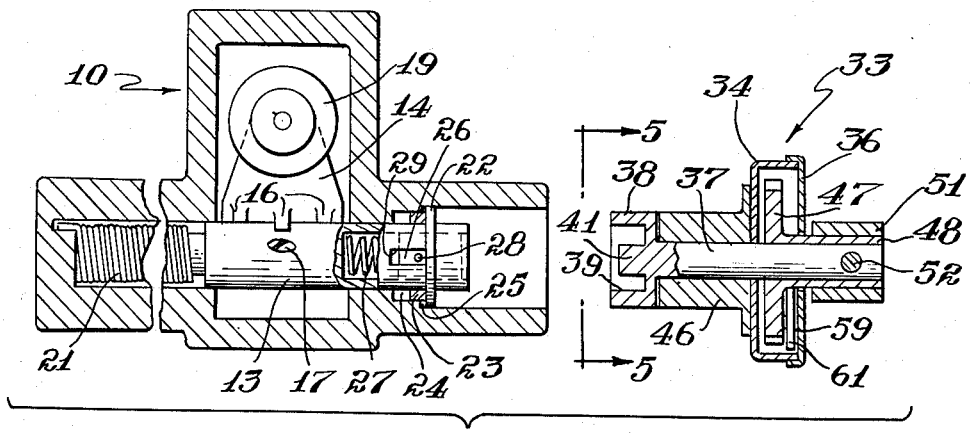
Figure 5:
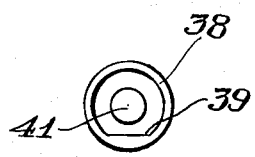

For the purpose of illustration a typical embodiment of the invention is shown in the accompanying drawings in which Fig. 1 is a front elevation with parts in section;
Fig. 2 is a front elevation with the operator in place;
Fig. 3 is a section on line 3—3 of Fig. 2;
Fig. 4 is a longitudinal vertical section through a key and valve with the parts separated;
Fig. 5 is an end view on the line 5—5 of Fig. 4;
Fig. 6 is a bottom plan of the operator with parts in section;
Fig. 7 is a front view of the operator with the cover removed; and
Figs. 8 to 10 are a series of diagrammatic views illustrating the sequence of operation.

The particular embodiment of the invention chosen for the purpose of illustration comprises an inlet casing 1, an outlet casing 2, a by-pass 3 interconnecting the inlet and outlet, a coupling 4 for connecting to a source of gas supply, a coupling 6 for connection to a customer's line, connections 7 and 8 to a meter 9 and valves 10 and 11 in the inlet and outlet casings. Each valve has a normal position such as illustrated in Figs. 1 and 8 in which gas can flow through the meter but not through the by-pass, and each has a by-pass position in which it seats on a valve seat 12 to obstruct flow through the meter and permit flow through the by-pass (Fig. 9). The openings in the casings 1 and 2 which are presented to the couplings 4 and 6 are large to permit ready access to the valves when the couplings are removed and they are so shaped that the couplings 4 and 6 may be connected either vertically as shown in Fig. 1 or horizontally with their threaded ends directed horizontally.

As shown in Figs. 3 and 4 each valve comprises a shaft 13 having a slot extending part way through it diametrically. Mounted in the slot is a flat arm 14 having struck-up tongues 16 to limit the extent to which the arm can be inserted into the shaft. As shown in Fig. 4 the blade is held in the shaft by means of a screw 17. Mounted on the free end of the arm 14 are two valve discs 18 and 19 of usual construction, one to seat on the end of the by-pass and the other to seat on 12. Each valve is yieldingly held in normal position by means of a torsion spring 21 which has one end anchored in the casing 1 and the other end anchored in the rear end of the valve shaft 13 (Fig. 4).

The front end of each valve shaft has a flange 22 seating against a ring 23 fast to the front end of a recess 24 with a flange 25 seating against a shoulder on the valve casing. The front end of each valve shaft also has an axial bore in which is mounted a sliding plug 26 pressed outwardly by a compression spring 27. Extending radially through the plug 26 is a pin 28 having its ends extending through slots 29 in the valve shaft and thence into recesses 31 in the rear end of the ring 23. Thus the valve cannot be moved from normal position until the plug 26 is pushed inwardly against the action of the spring 27 far enough for the ends of the pin 28 to leave the recesses 31 in the ring 23 and move back into the space 24 behind the ring. The outward movement of the plug 26 in response to spring 27 is limited by engagement of the ends of the pin 28 with the outer ends of the slots 29.

Each of the operators 33 comprises an elongate shallow housing 34 whose open front is closed by a cover 36. Extending through each end of the housing from front to rear is a shaft 37. Fast to the rear end of each shaft is a key 38 shaped to fit over the end of the valve shaft 13. As shown in Fig. 5 the key has a flat surface 39 and the end of the shaft 13 has a corresponding flat surface so that the key may turn the shaft when the parts are telescoped together. The key also has a central protuberance 41 which engages the plug 26 when the key is inserted, thereby to move the plug out of interlocking relationship with the ring 23 so that the shaft may be turned by the key. The keys may be held in this operative position in any suitable means, as for example by means of spring fingers 42 which snap into openings 43 in spring detents 44 fast to the valve casings (Fig. 3). To release the operator when the valves are in normal position (Fig. 8) the free ends of the fingers 44 are pressed toward the valve casings to release the fingers 42, whereupon the springs 27 automatically eject the keys and at the same time lock the valves in normal position by pushing the ends of the pins 28 into the recesses 31 of the rings 23.

The key shafts 37 are journaled in bearings 46 fast to the back of the housing 34. Mounted on each of the shafts 37 in the housing 34 is a wheel 47 having a tubular shaft 48 extending forwardly through an opening in the cover 36 and having a few latching notches as shown in Fig. 7. Mounted on the tubular shaft of the inlet key is a handle 49 and mounted on the tubular shaft of the outlet key is a signal arm 50, the parts being held together by collars 51 and screws 52 (Fig. 3).

Mounted on the two wheels 47 and 57 are pins 58 and 59 engaging in recesses in a connecting link 61, the recess 62 for the pin 58 being wider than the pin to afford lost-motion (Fig. 7). Associated with the wheels are pawls 63 and 64 engageable with the latching notches to hold the wheels in by-pass position. The pawls are pivoted on pins 66 and 67 and they have handles 68 and 69 extending downwardly through openings in the bottom of the casing to disengage them from the notches in wheels 47 and 57. A spring 71 interconnects the two pawls to urge them into contact with the wheels.

In Fig. 1 the valves are in normal position and in Fig. 2 the handle 49 and indicator 51 are shown in normal position. With the parts in these positions the flat 39 (Figs. 4 and 5) on each key aligns with the corresponding flat on the end of the valve shaft so that the parts can be telescoped together to the position shown in Fig. 3 where the spring fingers 42 snap into the recesses 43 of the spring fingers 44. Then by swinging the handle 49 ninety degrees in a counterclockwise direction (Fig. 2) the valves are removed from the normal position shown in Figs. 1, 4 and 8 to the by-pass position shown in Fig. 9 where the valve disks 19 seat on the valve seats 12. Rotation of the inlet valve shaft by the handle 49 in counterclockwise direction rotates the shaft of the outlet valve in clockwise direction through the medium of pins 58 and 59 and link 61. The pawls 63 and 64 latch the valves in by-pass positions. If the valves are not tightly seated in by-pass positions when the pawls snap into the first latching notches the wheels are turned until the valves are tightly seated, the pawls then snapping into successive notches.

After the meter has been replaced it is necessary to purge the meter of air before shifting the supply of gas from the by-pass to the meter. To do this the pawl 63 is disengaged from the wheel 47 to permit the inlet valve to move to an intermediate position such as shown in Fig. 10, the valve spring 21 (Fig. 4) automatically rotating the valve shaft when the wheel 47 is disengaged. When the pin 58 reaches the opposite side of the slot 62 (Fig. 7) it stops the inlet valve 11 in the mid-position shown in Fig. 10. In this position gas can still flow through the by-pass but it can also flow through the meter and thence out through the vent opening in the outlet valve casing when the plug 72 (Fig. 2) is removed. After the meter has been purged both valves are permitted to return to normal position by disengaging pawl 69.

Should the outlet pawl 64 be disengaged while the valves are both in by-pass position, both valves remain in the by-pass position because the shaft of the outlet valve cannot turn in a counterclockwise direction on account of the interlock between the two wheels 47 and 57 through link 61.

It should be understood that the present disclosure is for the purpose of illustration only and that this invention includes all modifications and equivalents which fall within the scope of the appended claims.

I claim:

1. Fluid-flow apparatus comprising a pair of fittings each having inlet, outlet and by-pass openings, a conduit interconnecting the by-pass openings, a valve at each end of said conduit, inlet and outlet keys for moving said valves respectively from normal position in which gas can flow through the inlet and outlet openings but not through the by-pass openings to by-pass position in which gas can flow from one fitting to the other only through the by-pass conduit, means interconnecting the keys for actuating them conjointly, springs tending to return the valves to normal position, means for latching the keys in by-pass position, and means for moving the inlet key from by-pass position while the outlet key is still latched in by-pass position.

2. Fluid-flow apparatus comprising a pair of fittings each having inlet, outlet and by-pass openings, a conduit interconnecting the by-pass openings, a valve at each end of said conduit, inlet and outlet keys for moving said valves respectively from normal position in which gas can flow through the inlet and outlet openings but not through the by-pass openings to by-pass position in which gas can flow from one fitting to the other only through the by-pass conduit, an actuator interconnecting the keys for actuating them conjointly, springs tending to return the valves to normal position, a latch for each key to hold it in by-pass position, and means for moving the inlet key from by-pass position while the outlet key remains in by-pass position.

3. Fluid-flow apparatus comprising a pair of fittings each having inlet, outlet and by-pass openings, a conduit interconnecting the by-pass openings, a valve at each end of said conduit, inlet and outlet keys for moving said valves respectively from normal position in which gas can flow through the inlet and outlet openings but not through the by-pass to by-pass position in which gas can flow from one fitting to the other only through the by-pass conduit, an actuator interconnecting the keys for actuating them conjointly, springs tending to return the valves to normal position, and a latch for each key to hold it in by-pass position, said actuator having a lost-motion connection which permits the inlet key to leave by-pass position when unlatched while the outlet key remains latched in by-pass position.

4. Fluid-flow apparatus comprising a pair of fittings each having inlet, outlet and by-pass openings, a conduit interconnecting the by-pass openings, a valve at each end of said conduit, inlet and outlet keys for moving said valves respectively from normal position in which gas can flow through the inlet and outlet openings but not through the by-pass to by-pass position in which gas can flow from one fitting to the other only through the by-pass conduit, means interconnecting the keys for actuating them conjointly, springs tending to return the valves to normal position, means for latching the keys in by-pass position, and means for moving the inlet key from by-pass position while the outlet key is still latched in by-pass position without permitting either key to leave by-pass position when only the outlet key is unlatched.

5. Fluid-flow apparatus comprising a pair of fittings each having inlet, outlet and by-pass openings, a conduit interconnecting the by-pass openings, a valve at each end of said conduit, inlet and outlet keys for moving said valves respectively from normal position in which gas can flow through the inlet and outlet openings but not through the by-pass to by-pass position in which gas can flow from one fitting to the other only through the by-pass conduit, an actuator interconnecting the keys for actuating them conjointly, springs tending to return the valves to normal position, a latch for each key to hold it in by-pass position, and means for moving the inlet key from by-pass position when unlatched while the outlet key remains latched in by-pass position without permitting either key to leave by-pass position when only the outlet key is unlatched.

6. Fluid-flow apparatus comprising a pair of fittings each having inlet, outlet and by-pass openings, a conduit interconnecting the by-pass openings, a valve at each end of said conduit, inlet and outlet keys for moving said valves respectively from normal position in which gas can flow through the inlet and outlet openings but not through the by-pass to by-pass position in which gas can flow from one fitting to the other only through the by-pass conduit, an actuator interconnecting the keys for actuating them conjointly, springs tending to return the valves to normal position, a latch for each key to hold it in by-pass position, said actuator having a lost-motion connection which permits the inlet key to leave by-pass position when unlatched while the outlet key remains latched in by-pass position without permitting either key to leave by-pass position when only the outlet key is unlatched.

References Cited in the file of this patent

UNITED STATES PATENTS

| | | |
|---|---|---|
| 996,013 | Friedrichs | June 20, 1911 |
| 2,579,656 | Douglas | Dec. 25, 1951 |